US012792629B1

(12) United States Patent
Kerr et al.

(10) Patent No.: US 12,792,629 B1
(45) Date of Patent: Nov. 10, 2026

(54) SECURITY INFORMATION AND EVENT MANAGEMENT AUGMENTATION SYSTEM

(71) Applicant: Morgan Stanley Services Group Inc., New York, NY (US)

(72) Inventors: Alec R. Kerr, Christiansburg, VA (US); Joseph T. Edmonds, Ellicott City, MD (US); Russell A. Moriarty, Ellicott City, MD (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/268,494

(22) Filed: Jul. 14, 2025

(51) Int. Cl.
*G06F 16/27* (2019.01)
*G06F 9/451* (2018.01)
*G06F 9/54* (2006.01)

(52) U.S. Cl.
CPC ............ *G06F 16/273* (2019.01); *G06F 9/451* (2018.02); *G06F 9/547* (2013.01)

(58) Field of Classification Search
CPC ......... G06F 16/273; G06F 9/451; G06F 9/547
USPC .......................................................... 707/610
See application file for complete search history.

(56) References Cited

U.S. PATENT DOCUMENTS

| | | | | |
|---|---|---|---|---|
| 7,418,431 | B1 * | 8/2008 | Nies | G06F 16/972 707/E17.117 |
| 7,926,030 | B1 * | 4/2011 | Harmon | G06F 9/451 717/121 |
| 8,346,747 | B2 * | 1/2013 | Liu | G06F 16/27 707/705 |
| 9,516,053 | B1 * | 12/2016 | Muddu | G06F 3/04847 |
| 11,061,548 | B1 * | 7/2021 | Catakli | H04L 67/75 |
| 11,171,939 | B1 * | 11/2021 | Blank | H04L 63/18 |
| 11,716,346 | B1 * | 8/2023 | Kraemer | H04L 63/20 |
| 11,736,527 | B1 | 8/2023 | Joseph Durairaj et al. | |
| 11,916,929 | B1 * | 2/2024 | Thimmegowda | H04L 63/1425 |
| 12,375,502 | B2 * | 7/2025 | Loomis | H04L 63/02 |
| 2005/0060174 | A1 * | 3/2005 | Heyward | G06Q 10/10 705/322 |
| 2005/0223022 | A1 * | 10/2005 | Weissman | G06F 16/2264 707/999.102 |

(Continued)

FOREIGN PATENT DOCUMENTS

WO WO-2024259174 A1 * 12/2024 ............ G06N 20/00

*Primary Examiner* — Tony Mahmoudi
*Assistant Examiner* — Michael Le
(74) *Attorney, Agent, or Firm* — Hunton Andrews Kurth LLP

(57) ABSTRACT

Systems and methods for augmenting a security information and event management (SIEM) platform are disclosed. An embodiment of the present invention includes a SIEM external case database configured to store extended SIEM case data, wherein the extended SIEM case data includes a copy of SIEM internal case data from a SIEM internal case database and additional case data. A unified application programming interface (API) is configured to interact with both the SIEM external case database and the SIEM internal case database. A graphical user interface (GUI) is configured to extend a SIEM internal GUI, wherein the GUI is configured to display both SIEM internal case data and extended SIEM case data. One or more processors may be configured to execute a plurality of modules, the modules including an automation module configured to perform one or more automated workflows using the extended SIEM case data.

14 Claims, 6 Drawing Sheets

(56) References Cited

U.S. PATENT DOCUMENTS

2006/0192702 A1* 8/2006 Choi .................... G06F 16/284
707/E17.005
2008/0059433 A1* 3/2008 Callan .................. G06F 16/954
2010/0011031 A1 1/2010 Huang et al.
2011/0184960 A1* 7/2011 Delpha ................ G06F 40/169
707/769
2015/0244775 A1* 8/2015 Vibhor ............... G06F 11/0772
709/203
2015/0326594 A1* 11/2015 Chari ................. H04L 63/1466
726/22
2016/0225271 A1* 8/2016 Robichaud ........... G06F 3/0484
2016/0277428 A1 9/2016 Lee et al.
2016/0292611 A1* 10/2016 Boe ................. G06Q 10/06393
2016/0378574 A1* 12/2016 Hejlsberg ............... G06F 16/27
719/328
2018/0027006 A1* 1/2018 Zimmermann ..... H04L 63/0227
726/11
2018/0089303 A1* 3/2018 Miller .................... G06F 16/26
2018/0096012 A1* 4/2018 Warshavsky ........ G06F 16/2282
2018/0167402 A1* 6/2018 Scheidler .............. G06N 20/00
2018/0324207 A1* 11/2018 Reybok, Jr. ......... H04L 63/1441
2018/0357273 A1* 12/2018 Srivastava .......... G06F 16/2448
2018/0367549 A1 12/2018 Jang et al.
2019/0147086 A1* 5/2019 Pal ..................... G06F 16/1734
707/718
2019/0172073 A1* 6/2019 Wiig ................... G06Q 30/018
2019/0236203 A1* 8/2019 De Boer .......... G06F 16/24549
2020/0043008 A1* 2/2020 Hrabik .................... H04L 67/10
2020/0106798 A1* 4/2020 Lin .................... H04L 63/1433
2020/0175077 A1 6/2020 Sharan et al.
2020/0327221 A1 10/2020 Street
2020/0401696 A1* 12/2020 Ringlein ................. G06N 3/08
2021/0352136 A1 11/2021 Dojka et al.
2022/0114252 A1 4/2022 Syed et al.
2022/0116291 A1* 4/2022 Hines .................... H04L 41/069
2022/0284065 A1* 9/2022 Gentilello ......... G06F 16/24578
2022/0391500 A1* 12/2022 Chen Kaidi .......... G06F 21/552
2023/0140637 A1* 5/2023 Dagley ............... G06F 16/9535
705/26.7
2023/0275907 A1* 8/2023 Bertiger .............. H04L 63/1425
726/22
2023/0334388 A1* 10/2023 McCarthy ...... G06Q 10/063112
2024/0028745 A1* 1/2024 Davies .................. G06F 21/554
2024/0048585 A1* 2/2024 Knapp ................ H04L 63/1433
2024/0179154 A1 5/2024 Goknel et al.
2024/0211592 A1 6/2024 Milazzo et al.
2024/0273188 A1 8/2024 Birsan et al.
2025/0088521 A1* 3/2025 Rahman .............. H04L 63/1441
2025/0165849 A1* 5/2025 Ali ........................ G06N 20/00
2025/0233884 A1* 7/2025 Sherr Lurie .......... G06F 21/577

* cited by examiner

SECURITY INFORMATION AND EVENT MANAGEMENT AUGMENTATION SYSTEM

FIELD OF THE INVENTION

The present invention relates generally to security information and event management (SIEM) systems and more specifically to an augmented SIEM system that extends the capabilities of existing SIEM platforms through integrated case management and automated workflows.

BACKGROUND

Security Information and Event Management (SIEM) systems play a crucial role in modern cybersecurity infrastructure. These systems collect, analyze, and correlate security event data from various sources across an organization's network to detect and respond to potential security threats. SIEM platforms typically provide capabilities for log management, real-time monitoring, incident response, and compliance reporting.

As cyber threats continue to evolve in complexity and sophistication, organizations face increasing challenges in effectively managing and responding to security incidents. Traditional SIEM systems may struggle to adapt to the specific needs and environments of different organizations as they lack the ability to store and query data specific to the environment in which they are deployed. The volume and variety of security data generated by modern networks can overwhelm existing SIEM platforms, making it difficult to identify and prioritize genuine threats among numerous alerts.

Many organizations deploy SIEM solutions as part of their security operations center (SOC) to centralize threat detection and incident response efforts. However, integrating SIEM platforms with other security tools and workflows can be complex and time-consuming. Analysts often need to switch between multiple interfaces and systems to investigate and respond to potential security incidents, which can lead to inefficiencies and delays in threat mitigation.

As cyber threats continue to evolve and organizational security needs become more complex, there is an ongoing need for improvements in SIEM technology. Enhanced capabilities for data integration, automated analysis, customization, and collaborative workflows could help organizations more effectively detect, investigate, and respond to security incidents in their unique environments.

Accordingly, there is a need for an improved system and method for augmented security information and event management system that extends the capabilities of existing SIEM platforms through integrated case management and automated workflows.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

An embodiment of the present invention is directed to a system and method that augments an existing Security Information and Event Management (SIEM) platform by integrating a layered, extensible case management architecture. The innovative system and method enhance an existing SIEM platform's capabilities for case enrichment, threat analysis automation, and cross-organizational collaboration.

According to an embodiment of the present invention, a computer-implemented system implements an augmented SIEM platform. The computer-implemented system comprises: a SIEM external case database configured to store extended SIEM case data, wherein the extended SIEM case data comprises a copy of SIEM internal case data from a SIEM internal case database and additional data fields specific to an environment and not present in the SIEM internal case database; a unified application programming interface (API) configured to interact with at least the SIEM external case database and the SIEM internal case database, wherein the unified API is configured to synchronize data between the SIEM external case database and the SIEM internal case database; and a graphical user interface (GUI) configured to display both SIEM internal case data and extended SIEM case data, wherein the GUI comprises one or more interface elements for interacting with the extended SIEM case data.

According to another embodiment, a computer-implemented method comprises the steps of: storing, via a SIEM external case database, extended SIEM case data, wherein the extended SIEM case data comprises a copy of SIEM internal case data from a SIEM internal case database and additional data fields specific to an environment and not present in the SIEM internal case database; providing a unified application programming interface (API) configured to interact with at least the SIEM external case database and the SIEM internal case database, wherein the unified API is configured to synchronize data between the SIEM external case database and the SIEM internal case database; and displaying, via a graphical user interface (GUI), both SIEM internal case data and extended SIEM case data, wherein the GUI comprises one or more interface elements for interacting with the extended SIEM case data.

The foregoing general description of the illustrative embodiments and the following detailed description thereof are merely exemplary aspects of the teachings of this disclosure and are not restrictive.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to an augmented Security Information and Event Management (SIEM) system that provides enhanced capabilities for managing and responding to security incidents within an organization's network infrastructure. An embodiment of the present invention may extend the functionality of existing SIEM platforms by integrating additional case management features, automated workflows, and cross-platform data analysis capabilities.

According to an embodiment of the present invention, the augmented SIEM system may include an external case database that stores extended case data alongside copies of internal SIEM case information. This two-tiered arrangement allows for the incorporation of additional metadata, evidence, and/or contextual information without disrupting the core functionality of the existing SIEM platform. The system may utilize a unified API to facilitate seamless interaction between the external and internal components, enabling consistent data synchronization and access across the entire system.

The augmented SIEM system may also feature an enhanced graphical user interface that integrates both internal and external SIEM components into a single, cohesive view. This interface may provide analysts with a comprehensive overview of security incidents, including extended case data, automated workflow options, and cross-platform analysis tools. By centralizing these capabilities, an embodiment of the present invention improves efficiency in threat detection, investigation, and response processes thereby reducing the time, effort and resources required to manage security incidents effectively.

Figure 1:
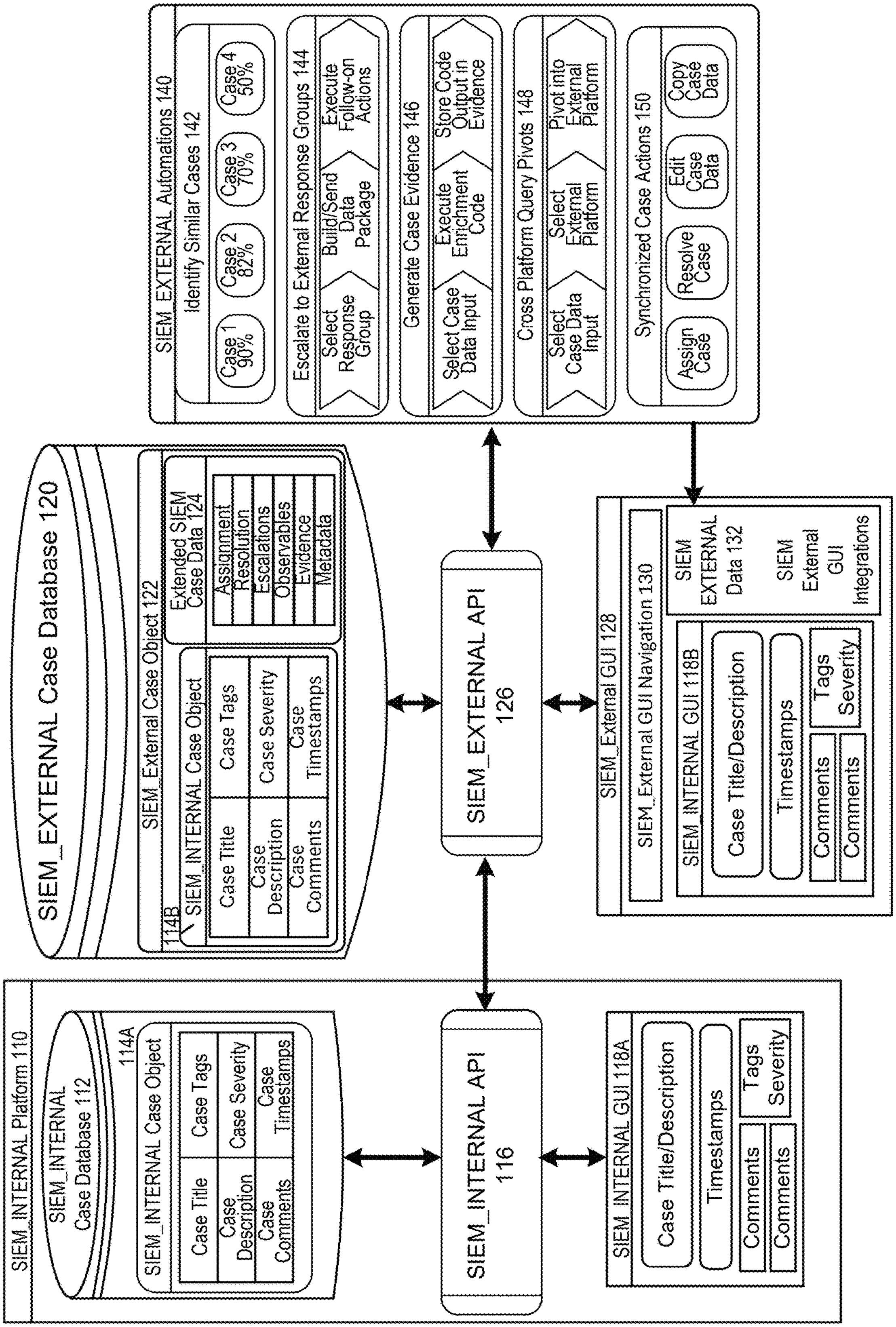
FIG. 1 is an exemplary system diagram of a Security Information and Event Management (SIEM) augmentation system, according to an embodiment of the present invention.

FIG. 1 is an exemplary system diagram of a Security Information and Event Management (SIEM) augmentation system, according to an embodiment of the present invention.

FIG. 1 demonstrates a SIEM augmentation platform deployed on top of an existing SIEM. An embodiment of the present invention is directed to augmenting an existing SIEM platform by integrating a layered, extensible case management architecture. The system enhances an existing SIEM platform's capabilities for case enrichment, threat analysis automation, cross-organizational collaboration, etc.

The SIEM augmentation system includes a SIEM Internal Platform 110 and a SIEM External Case Database 120 that interact through corresponding APIs 116, 126 and GUIs, 118A, 128. SIEM External API 126 facilitates case actions and synchronizes with SIEM Internal database 112. As shown in FIG. 1, SIEM External API 126 synchronies and manages data across Internal Case Database 112 and External Case Database 120, allowing seamless interaction with both datasets and modular integration of automation components.

SIEM Internal Platform 110 may contain an Internal Case Database 112 that stores and manages Internal Case Objects 114A with case information, e.g., case title, case description, case comments, case tags, case severity, case timestamps, etc. SIEM Internal API 116 may facilitate interaction with Internal Case Database 112, while an Internal GUI 118A provides a user interface for viewing and managing internal case data through various user interactions. Internal GUI 118A may provide case title/description, timestamps, comments, tags, severity, etc.

External Case Database 120 stores and manages External Case Object 122 that incorporates Internal Case Object 114B and Extended Case Data 124. External Case Object 122 may contain copies of internal case objects along with additional environment-specific information. In this example, SIEM Internal Case Object 114B represents a copy of SIEM Internal Case Object 114A.

An embodiment of the present invention is directed to a layered database architecture (SIEM_External) that stores a nested copy of the native SIEM database (SIEM_Internal) alongside environment-specific enrichments, preserving data integrity while enabling context-aware case management. Extended Case Data 124 may include Assignment, Resolution, Escalations, Observables, Evidence, Metadata, etc. This additional enriched information may be tailored to the specific deployment environment. Extended Case Data 124 may also include: alert data, automation output, notes data, history data, etc.

Assignments may support user and group assignments that may be organization specific.

A SIEM internal platform may support opening and closing cases but it may not support assigning an output to that case for a specific environment. The resolution may be stored and supported by Extended Case Data 124 within External Case Object 122.

Escalations may involve identifying an external response group and a group-specific escalation data package.

Observables may represent pieces of data (e.g., IP address, host name, etc.) extracted from a case and may be stored in External Case Database 120.

Evidence may be context generated by analysts. For example, evidence may include other users who logged into a particular host name within a certain timeframe. This evidence may be stored in SIEM external case database 120 and may be accessed by other analysts and systems to understand within a more complete context. Additionally, evidence may be generated and stored by case automations. For example, a case may include an IP address observable. A processor may automatically (with or without user input) add information about that IP (such as traffic history) to the case evidence.

Metadata associated with evidence may be stored and used to provide additional context and insights.

External API 126 manages interactions with both the external and internal databases through appropriate translations of API calls. For example, an external API request received by External API 126 may update SIEM Internal Case Database 112 and those requests may be translated into appropriate API requests for SIEM Internal Case Database 112 via Internal API 116.

The system may include an external GUI 128 that incorporates external GUI navigation 130 and external data 132 components. The external GUI 128 may wrap around the internal GUI 118B to provide a unified interface for users. In this example, Internal GUI 118B may represent a copy of Internal GUI 118A.

GUI 128 may represent a single pane of glass GUI overlay that enables analysts to interact with both systems at the same time. GUI 128 may extend an existing SIEM GUI 118A, providing a unified toolset for analysts to access and manipulate both internal and external data without disrupting the SIEM's standalone functionality.

An embodiment of the present invention may support various automations, as shown by External Automations 140, that provide additional functionality through multiple processors and/or systems. According to an embodiment of the present invention, External Automations 140 may include: Identify Similar Cases 142; Escalate to External Response Groups 144, Generate Case Evidence 146, Cross Platform Query Pivots 148 and Synchronized Case Actions 150. Other functionality may include removing a case assignment for an idle user. External Automations 140 shown in FIG. 1 is illustrative only and may be further customized to support various environments, industries, applications, etc.

Identify Similar Cases 142 may provide the ability to analyze cases to find similarities between them. This allows for internal and external case data comparisons. With this feature, an analyst may compare specific fields (e.g., case tags, observables, etc.) and then determine how similar one case is to another. As shown in FIG. 1, a percentage of similarity may be displayed for each case. Other metrics or indicators of similarity may be provided.

Escalate to External Response Groups 144 manages the routing of cases to external response groups. This may include routing to external response groups with group-specific data packages. As shown in FIG. 1, a response group may be selected, a data package may be built/sent and follow-up actions may be executed. Additional details are provided in FIG. 2.

Generate Case Evidence 146 may receive case data as an input, enrich the case data with contextual information and store the outputs in the external case database 120 to support further analysis. Evidence may include contextual data and various types of information generated by analysts. As shown in FIG. 1, case data input may be selected, enrichment code may be executed and code output may be stored or managed. Additional details are provided in FIG. 3.

Cross Platform Query Pivots 148 enables cross-platform data queries. For example, an analyst may want to access additional information relating to a host name relevant to a specific environment. This feature may be used to access or pivot to an asset inventory or other platform for enhanced data and analytics. As shown in FIG. 1, case data input may be selected, an external platform may be selected and a pivot action into the external platform may be provided. The pivot feature may support multiple platforms across various external and/or internal sources. Additional details are provided in FIG. 4.

Synchronized Case Actions 150 provides an ability to synchronizes actions between the internal and external systems. With this feature, a case action may be sent through External API 126 and translated into Internal API 116. Accordingly, updates may be made in both internal case database 112 an external case database 120. As shown in FIG. 1, case actions may include: assign case, resolve case, edit case data, copy case data, etc. Additional details are provided in FIG. 5.

In addition, an embodiment of the present invention may support post escalation memorialization of events and task indicators of compromise (IOCs) for future analysis.

The components interact through the APIs to maintain data consistency while enabling extended functionality beyond the base SIEM capabilities. External API 126 translates requests between the internal API 116 and external systems as needed. In some cases, the SIEM augmentation system may be deployed on top of an existing SIEM platform without disrupting the existing platform's ability to function independently. Other processing, memory and communication components may be integrated.

Figure 2:
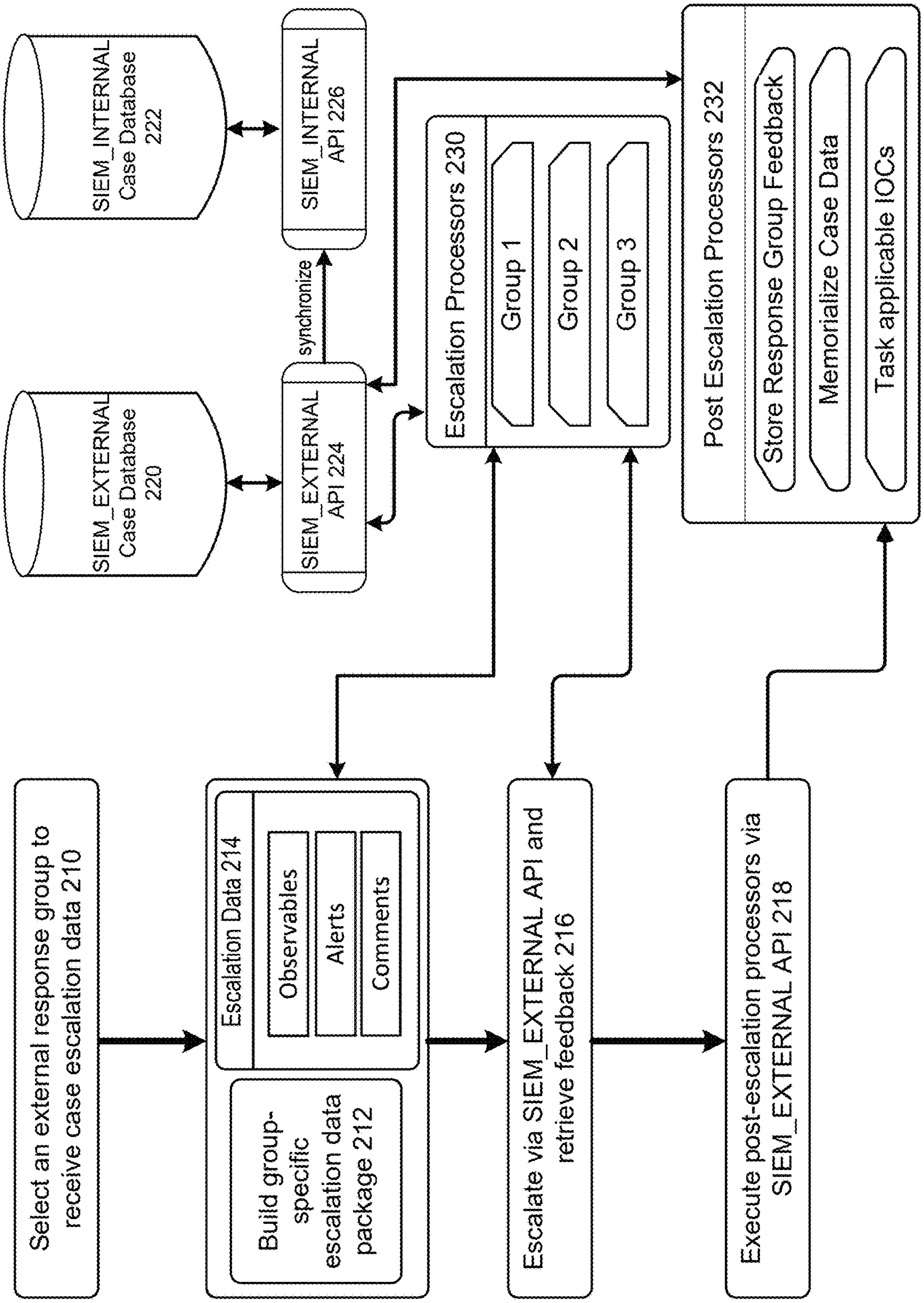
FIG. 2 is an exemplary escalation flow diagram, according to an embodiment of the present invention.

FIG. 2 is an exemplary escalation flow diagram, according to an embodiment of the present invention. FIG. 2 illustrates an exemplary escalation process undertaken on a case which requires remediation by an external group. That group may receive case data and provide feedback. Afterwards, post-escalation actions may be executed.

At 210, an external response group may be identified or selected to receive case escalation data. At 212, a group-specific escalation data package may be built. For business email compromise cases, a particular response group may require a certain template of data. The package may include escalation data 214, which may include observables, alerts, comments, etc. The package may conform to an expected template, requirements, etc.

The system utilizes External Case Database 220 and Internal Case Database 222, which may interact through External API 224 and Internal API 226, respectively. These APIs may be configured to synchronize with each other to maintain data consistency.

The escalation data package may be built at 212 and Escalation Data 214 may be processed through Escalation Processors 230, which may contain multiple groups (e.g., Group 1, Group 2, Group 3) for handling different types of escalations. At 216, the system may escalate via External API 224 and retrieve escalation and other feedback.

After escalation, Post Escalation Processors 232 may execute various functions, as shown by 218. In some cases, these functions may include storing response group feedback, memorializing case data, and tasking applicable Indicators of Compromise (IOCs) for future analysis. For example, IOCs may indicate that a certain IP address is suspicious and provide an alert for the IP address. Post Escalation Processors 232 may operate through External API 224 to update and maintain case information.

The system may enable bidirectional communication between the external and internal components through the synchronized APIs 224, 226, allowing for coordinated processing of escalation data and feedback across both databases 220, 222. This arrangement may facilitate seamless integration of the SIEM augmentation system with existing SIEM platforms while maintaining independent functionality of the internal platform. While two databases are shown for illustration purposes, an embodiment of the present invention may support additional databases across various locations. Other architectures may be supported.

Figure 3:
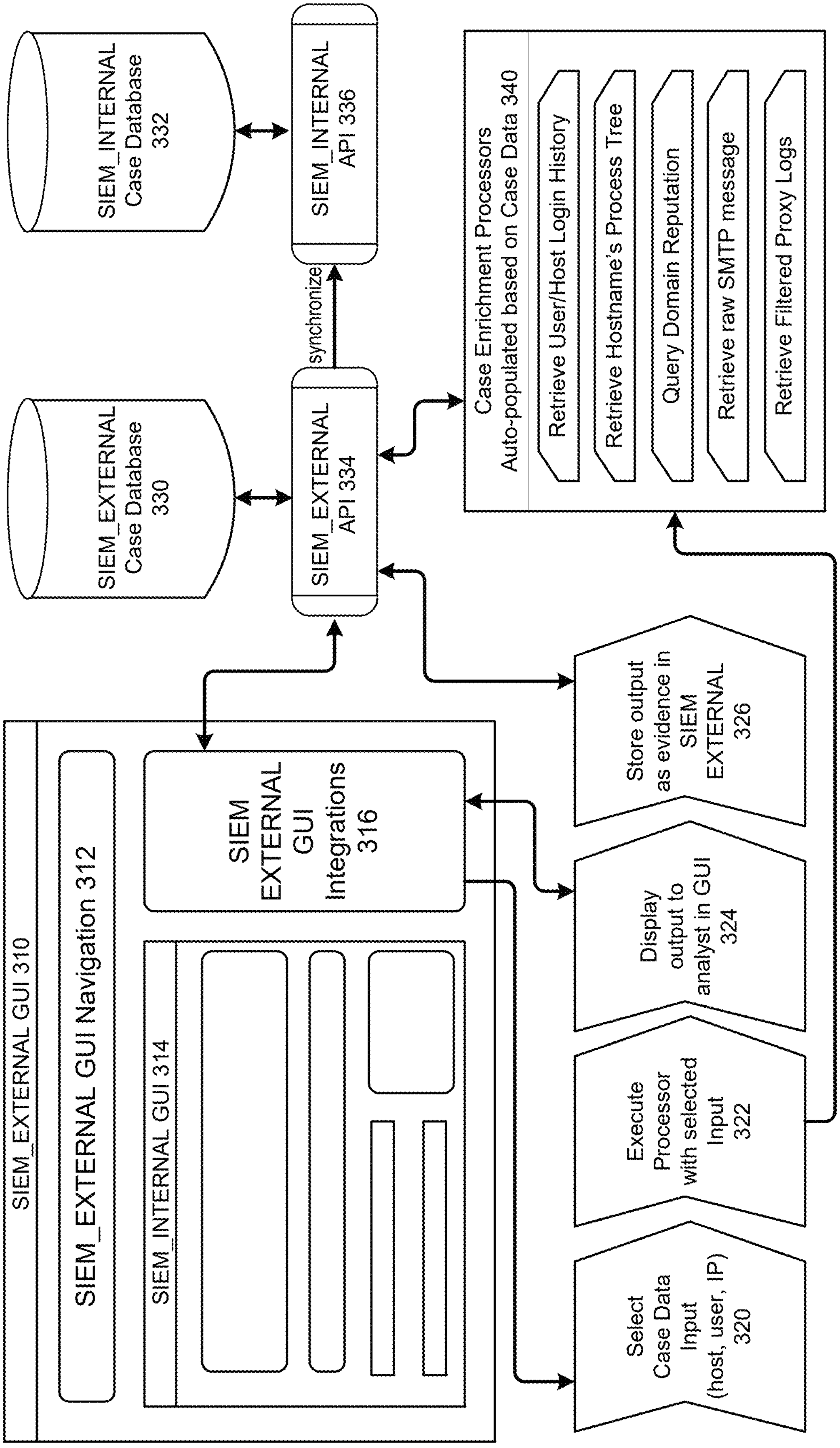
FIG. 3 is an exemplary evidence management flow diagram, according to an embodiment of the present invention.

FIG. 3 is an exemplary evidence management flow diagram, according to an embodiment of the present invention. FIG. 3 demonstrates a workflow for generating case evidence via enrichment processors with case data input. Output may be stored within SIEM External 330. Available Enrichment processors may be selected for each case based on corresponding contents.

As shown in FIG. 3, External GUI 310 may include a navigation interface, as shown by 312, and encompass an internal GUI 314. External GUI Integrations 316 may interface with various graphical interfaces to provide extended functionality and integrations. For case enrichment and evidence processing, External GUI Integrations 316 may support integrations that perform data input, execute processors, generate displays, manage storage, etc.

For example, an analyst may select case data of interest, as shown by 320. Case data may include host, user, IP address and/or other information. This input data may be processed by a processor, as shown by 322. This may include retrieving host login history. The results of this processing (e.g., other users that logged into the host within a time frame or other condition) may be presented to analysts through a display output, as shown by 324, which interfaces with graphical user interfaces. The analyst may access the display output and make determinations. The output may be stored as evidence in External Case Database 330, as shown by 326.

The system utilizes separate but interconnected databases, such as External Case Database 330 and Internal Case Database 332. These databases may communicate through External API 334 and Internal API 336, with synchronization maintained between them to ensure data consistency. Other architectures may be supported.

Case enrichment processors 340 may contain multiple automated processors for retrieving and analyzing case data. In some cases, these processors may perform functions such as retrieving user/host login history, retrieving hostname's process trees, querying domain reputation, retrieving raw SMTP messages, and retrieving filtered proxy logs. Additional functions may include: endpoint device's logs retrieval, asset's network logs retrieval, hostname login history retrieval, etc. Other functions may be supported to support various applications and scenarios. This automated workflow for enriching cases with additional data and context further enhances the system's capability for comprehensive case analysis.

The components of the system are arranged to enable data flow from input through processing to storage and display, while maintaining synchronization between the external and internal systems through their respective interfaces. This arrangement may allow for seamless integration of extended functionality while preserving the core SIEM capabilities.

Figure 4:
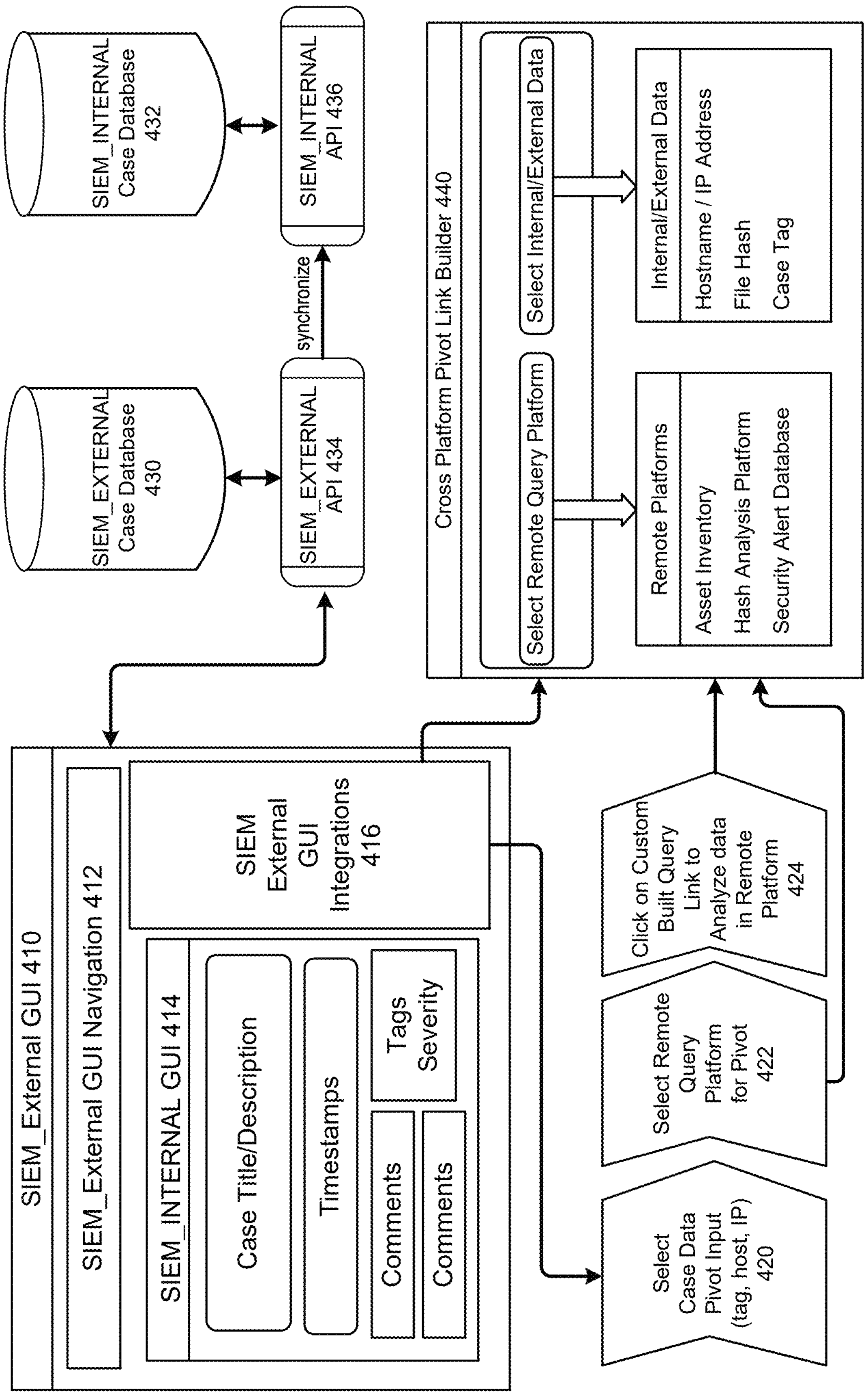
FIG. 4 is an exemplary system diagram of a SIEM augmentation system with pivot integration, according to an embodiment of the present invention.

FIG. 4 is an exemplary system diagram of a SIEM augmentation system with pivot integration, according to an embodiment of the present invention. FIG. 4 demonstrates a SIEM external integration which enables cross platform query pivots. For example, a piece of case data (from SIEM internal or SIEM external) may be selected, along with an external platform (e.g., an asset inventory). A pivot link (e.g., URL) may be created based on these selections which may then navigate a user to the selected platform with a pre-populated query thereby allowing analysts to seamlessly access and analyze data from multiple sources.

As shown in FIG. 4, External GUI 410 provides a user interface layer for interacting with both external and internal SIEM components. An external navigation interface, as shown by 412, enables navigation through the system's features, while Internal GUI 414 displays case information and data from an internal SIEM system. For example, Internal GUI 414 may provide case title/description; timestamps; comments, tags, severity, etc. External GUI Integrations 416 facilitate interaction between the external and internal components.

An embodiment of the present invention may be directed to cross-platform data analysis and pivot link building capabilities. External GUI Integrations 416 may support integrations that perform data input, execute processors, generate displays, manage storage, etc.

As shown in FIG. 4, case data pivot input may be selected at 420. Data input may include tag, host, IP address and/or other information. A remote query platform may be selected for pivot, at 422. User interaction may include: clicking on a custom built query link to analyze data in the remote platform, at 424

Data storage may be managed through External Case Database 430 and Internal Case Database 432. External API 434 and Internal API 436 provide communication channels between the system components and their respective databases.

Cross Platform Pivot Link Builder 440 enables cross-platform data analysis by creating connections between different data sources and platforms. In some cases, Cross Platform Pivot Link Builder 440 may facilitate the integration of remote platforms and internal/external data sources, allowing for comprehensive data analysis and case management.

An embodiment of the present invention may enable cross-platform query pivoting to allow users to pivot from case data to an external system, such as an external asset inventory system. For example, an analyst may select a hostname from a case, and the pivot link builder 440 may enable selection of a remote query platform and internal/external data. Remote platforms may include: asset inventory, hash analysis platform, security alert database, etc. Internal/external data may include: hostname, IP address, file hash, case tag, username, domain, etc. Other variations may be supported. An embodiment of the present invention may allow users to choose from multiple external platforms or data sources for pivoting.

External API 434 and Internal API 436 may work in conjunction to maintain data consistency across platforms. When data is retrieved from an external system through a pivot link, External API 434 may process and format this data for integration with the existing case information in External Case Database 430.

The system components are interconnected to enable data flow between the external and internal elements, with synchronization occurring between External API 434 and Internal API 436. This arrangement may allow for seamless integration of extended functionality while maintaining the core SIEM capabilities, enabling comprehensive cross-platform analysis of security events and related data.

Figure 5:
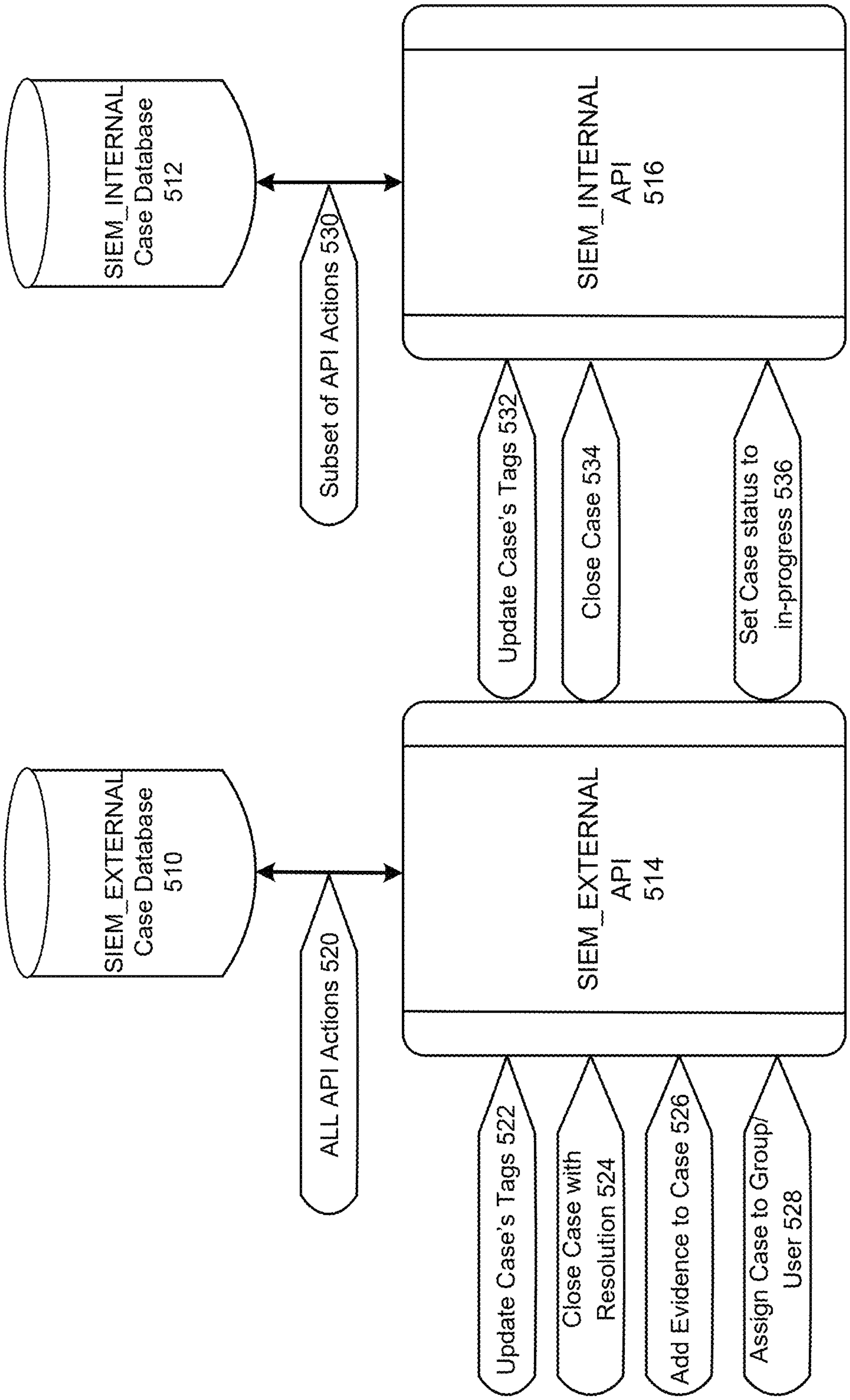
FIG. 5 is an exemplary system diagram of SIEM augmentation system synchronization, according to an embodiment of the present invention.

FIG. 5 is an exemplary system diagram of SIEM augmentation system synchronization, according to an embodiment of the present invention. FIG. 5 illustrates examples of SIEM External queries which may update cases within the SIEM External database. When relevant, these queries may also be translated into SIEM internal queries in order to update the SIEM internal database. FIG. 5 further illustrates the interactions between external and internal APIs with the SIEM augmentation system. The system includes an external case database 510 and an internal case database 512 that stores and manages case information.

External API 514 interfaces with External Case Database 510 while Internal API 516 interfaces with Internal Case Database 512. External API 514 may receive all API actions 520, while Internal API 516 may receive a subset of API Actions 530.

External API 514 may support various inputs and functions for handling different types of case operations. These inputs may include: Update Case's Tags 522 for modifying case tags, Close Case with Resolution 524 for handling case resolutions, Add Evidence to Case 526 for managing case evidence, and Assign Case to Group/User 528 for handling case assignments.

Internal API 516 may support/process a subset of the API actions. These inputs may include: Update Case's Tags 532 for updating tags in the internal database; Close Case 534 for closing cases; and Set Case Status to in-progress 536 for modifying case status. Other functions and/or processing may be supported.

The system may enable bidirectional communication between External Case Database 510 and Internal Case Database 512 through their respective APIs. When actions are performed through External API 514, corresponding actions may be translated and executed through Internal API 516 to maintain synchronization between the databases.

This synchronization enables seamless user interaction with both datasets. For example, when a user updates a case tag, as shown by 522, through External API 514, this action may be processed and the external case database 510 may be updated. In addition, External API 514 may translate this action into a corresponding request for Internal API 516, which may then update the case tag, as shown by 532, and further update the internal case database 512 accordingly.

Case resolution, via external API 514, may handle case resolutions that are not supported by the internal SIEM system. In such cases, close case with resolution 524 may be received by External API 514 which then may store the resolution information in External Case Database 510. The action may be translated into a case closure request for Internal API 516, which may then perform a close case action, as shown by 534, to update Internal Case Database 512.

Case evidence may be managed, as shown by 526, which may not be supported by an internal SIEM system. In this case, there is no API call and the evidence is stored in External Case Database 510 without requiring any corresponding action by Internal API 516.

Case assignments may be handled, as shown by 528, which may not supported by an internal SIEM system. When a case is assigned, an embodiment of the present invention may update External Case Database 510 and translate the action into a status update request for Internal API 516, which may then update the case status, as shown by 536, to reflect the assignment in Internal Case Database 512.

This API interaction and data synchronization mechanism may allow the SIEM augmentation system to extend the capabilities of the existing SIEM system while maintaining data consistency across both databases. The system may provide additional functionality through External API 514 while preserving the core functionality of the internal SIEM system through Internal API 516.

Accordingly, by using APIs to translate calls, the underlying SIEM is not impacted and may continue to function independently.

Figure 6:
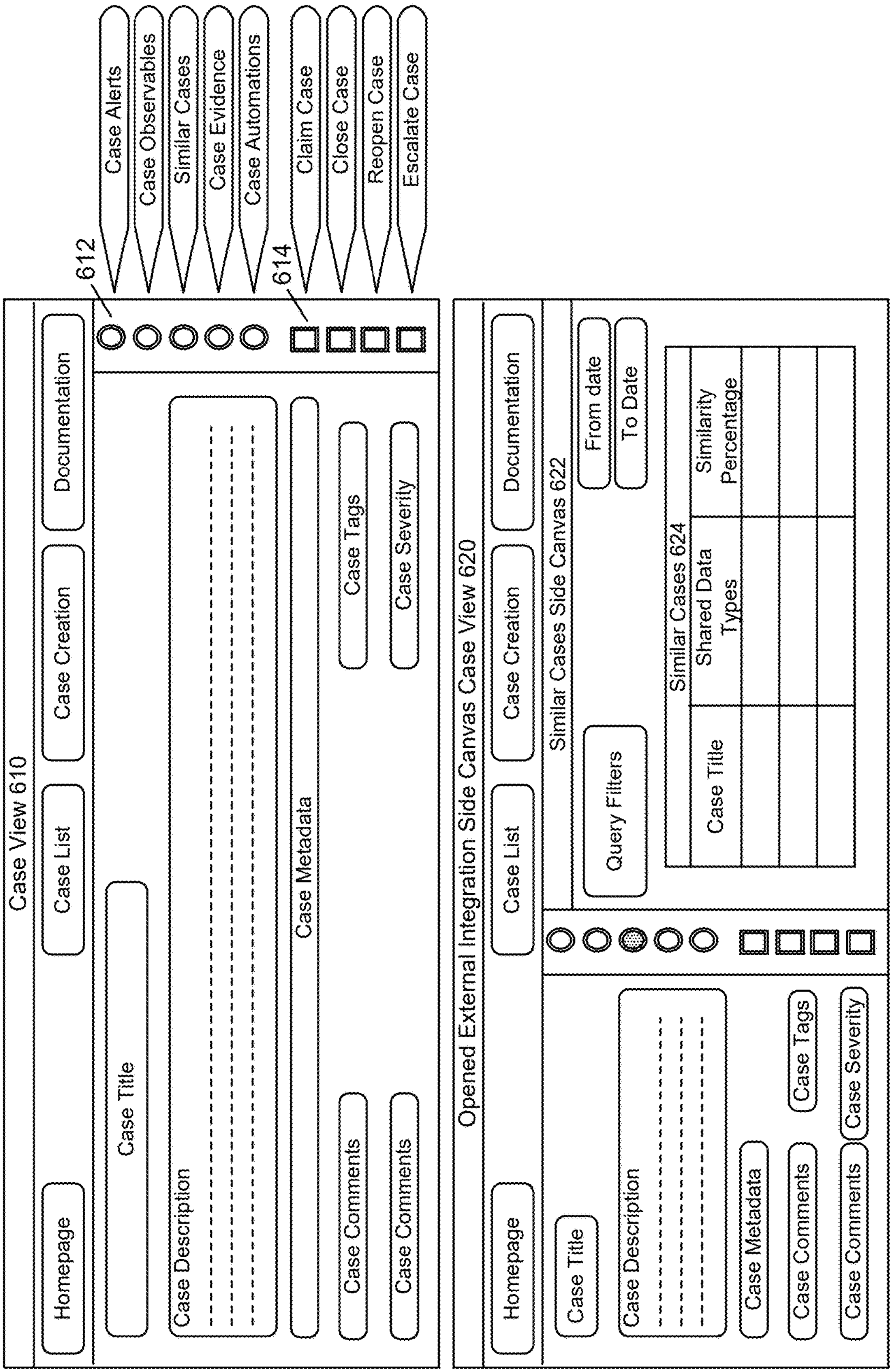
FIG. 6 is an exemplary user interface, according to an embodiment of the present invention.

FIG. 6 is an exemplary user interface, according to an embodiment of the present invention. FIG. 6 illustrates an exemplary SIEM internal interface contained within the SIEM external interface wrapper. Other variations in user interfaces and user interactions may be supported.

An exemplary user interface may include Case View 610 that displays case information. Case View 610 may include fields for case title, case description, case metadata, case comments, case tags, and case severity indicators. A first set of interactive elements 612 may provide access to external integrations such as case alerts, case observables, similar cases, case evidence, and case automations. A second set of interactive elements 614 may be used to invoke case actions via the SIEM External API. These interactive elements may include claim case, close case, reopen case and escalate case.

An external graphical interface may incorporate an Opened External Integration Side Canvas View 620 that may be displayed alongside Case View 610. Opened External Integration Side Canvas View 620 may include a Similar Cases Side Canvas 622 with Query Filters and date range selectors for finding related cases. Similar Cases Side Canvas 622 may include a Similar Cases 624 as a table or other format to display matching cases. Similar Cases 624 may contain columns for case title, shared data types, and similarity percentage to help analysts identify patterns and relationships between cases. Other formats may be provided.

The external graphical interface may facilitate the integration of automated workflows for enriching cases with additional data and context. For example, the similar cases side canvas 622 may utilize the case identifier of the automation system to analyze and display similar cases based on data from both the internal case database and the external case database.

Opened External Integration Side Canvas Case View 620 may provide access to extended functionality enabled by the SIEM augmentation system. In some cases, this may include interfaces for interacting with functionality related to similar cases, case escalation, case evidence, and/or query pivots of the automation system. Other functionality and integrations may include: viewing/editing case alerts and observables.

Case View 610 may display extended case data stored in the external case database. This may include information such as user-assignment, evidence, observables, alert metadata, case creation details, escalations, and resolutions that are not supported by the internal platform.

The external graphical interface may wrap around the internal graphical interface to provide a unified interface for users. This arrangement may create a single-pane-of-glass experience, allowing analysts to interact with both internal and external data using a unified set of tools.

The interface elements may be arranged to provide efficient access to both the core SIEM functionality and the extended capabilities added by the augmentation system, while maintaining a cohesive user experience. This arrangement may allow analysts to seamlessly navigate between internal and external data, execute automated workflows, and manage cases more effectively.

An embodiment of the present invention is directed to improving the flexibility, extensibility, and ease of use of a SIEM platform. An embodiment of the present invention enables the ad-hoc integration of environment-specific data, workflows and external organization interactions, allowing a SIEM to adapt to any environment. In addition, the SIEM augmentation system may be implemented in conjunction with pre-existing SIEM systems to extend their capabilities with various environment specific integrations.

The system components illustrated in the Figures above are exemplary and illustrative and may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The systems illustrated above may be implemented in a variety of ways. Architecture within the illustrated systems may be implemented as hardware components (e.g., module) within one or more network elements. It should also be appreciated that architecture within the systems may be implemented in computer executable software (e.g., on a tangible, non-transitory computer-readable medium) located within one or more network elements. Module functionality of architecture within the systems may be located on a single device or distributed across a plurality of devices including one or more centralized servers and one or more mobile units or end user devices. The architecture depicted in the systems is meant to be exemplary and non-limiting. For example, while connections and relationships between the elements of the systems are depicted, it should be appreciated that other connections and relationships are possible. The systems described above may be used to implement the various methods herein, by way of example. Various elements of the systems may be referenced in explaining the exemplary methods described herein.

Connections illustrated in the Figures above may represent networks including wireless network, a wired network or any combination of wireless network and wired network. Networks may further include one, or any number of the exemplary types of networks operating as a standalone network or in cooperation with each other. Networks may utilize one or more protocols of one or more network elements to which it is communicatively coupled. Networks may translate to or from other protocols to one or more protocols of network devices. Although the connections in the Figures may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the Figures above illustrate individual devices or components, it should be appreciated that there may be several of such devices to carry out the various exemplary embodiments. Systems may communicate using any mobile or computing device capable of sending or receiving network signals.

Systems may be communicatively coupled to various local and remote storage components. These storage components may include any suitable data structure to maintain the information and allow access and retrieval of the information. The storage may be local, remote, or a combination. The storage components may have back-up capability built-in. Communications with the storage components may be over a network or communications may involve a direct connection between the various storage components, as depicted in the Figures above. The storage components may also represent cloud or other network based storage.

Those skilled in the art will appreciate that the diagrams discussed above are merely examples of a system and a method for implementing an augmented SIEM system through integrated case management and automated workflows and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, .NET, Python, Java, Modula-2, Pascal, Prolog, REXX, Visual Basic, JavaScript and other languages. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system for augmenting a security information and event management (SIEM) platform, comprising:

a SIEM external case database configured to store extended SIEM case data, wherein the extended SIEM case data comprises a copy of SIEM internal case data from a SIEM internal case database and additional data fields specific to an environment and not present in the SIEM internal case database;

a unified application programming interface (API) configured to interact with at least the SIEM external case database and the SIEM internal case database, wherein the unified API is configured to synchronize data between the SIEM external case database and the SIEM internal case database and the unified API is configured to translate API calls between a SIEM external API format and a SIEM internal API format;

a graphical user interface (GUI) configured to display both SIEM internal case data and extended SIEM case data, wherein the GUI comprises one or more interface elements for interacting with the extended SIEM case data; and one or more processors configured to execute a plurality of modules, the plurality of modules comprising an automation module configured to perform automated workflows using both the SIEM internal case data and the extended SIEM case data, wherein the automation module is configured to perform: identifying one or more similar cases, generating case evidence, performing cross-platform query pivots, facilitating case escalation to at least one external response group and removing a case assignment for an idle user and wherein the automation module is further configured to perform cross-platform query pivots by using both SIEM internal case data and extended SIEM case data to query one or more external platforms, wherein performing cross-platform query pivots further comprises generating, via a pivot link builder, a pivot link based on selected case data and a selected external platform, wherein the pivot link navigates a user to the selected external platform with a pre-populated query.

2. The computer-implemented system of claim 1, wherein the additional data fields include at least one of: user assignment data, case resolution data, case escalation data, observables data, evidence data, alert data, automation output, notes data or history data.

3. The computer-implemented system of claim 1, wherein the GUI is configured to wrap around a SIEM internal GUI.

4. The computer-implemented system of claim 1, wherein the automation module is configured to identify similar cases by comparing both SIEM internal case data and extended SIEM case data across multiple cases.

5. The computer-implemented system of claim 1, wherein the automation module is configured to generate case evidence by executing one or more case enrichment processors using selected case data as input.

6. The computer-implemented system of claim 5, wherein the one or more case enrichment processors include at least one of: a user login history retriever, a process tree generator, a domain reputation analyzer, an SMTP message retriever, a proxy log filter, endpoint device's logs retrieval, asset's network logs retrieval, or hostname login history retrieval.

7. The computer-implemented system of claim 1, wherein the automation module is configured to facilitate case escalation to at least one external response group by generating group-specific data packages using both SIEM internal case data and extended SIEM case data.

8. A computer-implemented method for augmenting a security information and event management (SIEM) platform, comprising:

storing, via a SIEM external case database, extended SIEM case data, wherein the extended SIEM case data comprises a copy of SIEM internal case data from a SIEM internal case database and additional data fields specific to an environment and not present in the SIEM internal case database;

providing a unified application programming interface (API) configured to interact with at least the SIEM external case database and the SIEM internal case database, wherein the unified API is configured to synchronize data between the SIEM external case database and the SIEM internal case database;

translating API calls between a SIEM external API format and a SIEM internal API format using the unified API;

displaying, via a graphical user interface (GUI), both SIEM internal case data and extended SIEM case data, wherein the GUI comprises one or more interface elements for interacting with the extended SIEM case data; and performing, via one or more processors, automated workflows using both the SIEM internal case data and the extended SIEM case data, wherein the one or more processors are configured to perform: identifying one or more similar cases, generating case evidence, performing cross-platform query pivots, facilitating case escalation to at least one external response group and removing a case assignment for an idle user and wherein performing cross-platform query pivots comprises using both SIEM internal case data and extended SIEM case data to query one or more external platforms, wherein performing cross-platform query pivots further comprises generating, via a pivot link builder, a pivot link based on selected case data and a selected external platform, wherein the pivot link navigates a user to the selected external platform with a pre-populated query.

9. The computer-implemented method of claim 8, wherein the additional data fields include at least one of: user assignment data, case resolution data, case escalation data, observables data, evidence data, alert data, automation output, notes data or history data.

10. The computer-implemented method of claim 8, wherein the GUI is configured to wrap around a SIEM internal GUI.

11. The computer-implemented method of claim 8, wherein identifying similar cases comprises comparing both SIEM internal case data and extended SIEM case data across multiple cases.

12. The computer-implemented method of claim 8, wherein generating case evidence comprises executing one or more case enrichment processors using selected case data as input.

13. The computer-implemented method of claim 12, wherein the one or more case enrichment processors include at least one of: a user login history retriever, a process tree generator, a domain reputation analyzer, an SMTP message retriever, a proxy log filter, endpoint device's logs retrieval, asset's network logs retrieval, or hostname login history retrieval.

14. The computer-implemented method of claim 8, wherein facilitating case escalation to at least one external response group comprises generating group-specific data packages using both SIEM internal case data and extended SIEM case data.

* * * * *